United States Patent [19]
Thompson et al.

[11] 3,906,564
[45] Sept. 23, 1975

[54] REMOTELY CONTROLLED UNDERWATER INSTRUMENT SYSTEM

[75] Inventors: Clifford T. Thompson, Tracyton; Dennis J. Schwab, Bremerton, both of Wash.

[73] Assignee: The United States of America as represented by the Secretary of the Navy, Washington, D.C.

[22] Filed: Dec. 15, 1972

[21] Appl. No.: 315,390

[52] U.S. Cl.............. 9/8 R; 61/46.5; 114/16.7; 114/206 R
[51] Int. Cl.² ........................................ B63B 21/52
[58] Field of Search ........ 244/33; 73/170 A; 9/8 R; 254/173 R, 174; 114/206 R, 16.5, 16.6, 16.7; 61/46.5

[56] References Cited
UNITED STATES PATENTS

| | | | |
|---|---|---|---|
| 1,731,785 | 10/1929 | Mansell | 114/206 R |
| 1,819,681 | 8/1931 | Horuith | 114/16 R |
| 2,341,923 | 2/1944 | Koteleu et al. | 114/16.7 |
| 2,433,344 | 12/1947 | Crosby | 244/33 X |
| 2,600,761 | 6/1952 | Halliburton | 61/46.5 |
| 3,039,391 | 6/1962 | Lofthus | 254/173 R X |
| 3,052,878 | 9/1962 | Berry | 254/174 X |
| 3,351,965 | 11/1967 | Burkhardt | 9/8 R |
| 3,479,828 | 11/1969 | Luque | 61/46.5 |
| 3,695,103 | 10/1972 | Olson | 73/170 A |

*Primary Examiner*—Trygve M. Blix
*Assistant Examiner*—Gregory W. O'Connor
*Attorney, Agent, or Firm*—R. S. Sciascia; Charles D. B. Curry

[57] ABSTRACT

An instrument system that is mounted on the ocean floor that may be used for generating and receiving sound signals. The system includes a buoyant instrument package that is raised and lowered by a support cable driven by winch and power drive assemblies that are controlled and powered from a remote shore station. The system includes a tower that is attached to a base member upon which the winch and power drive assemblies are mounted. The base member includes a plurality of downwardly extending blades and angularly positioned plates that securely support the system when resting on the ocean floor. When retracted, the buoyant instrument package floats a few feet above the tower. The cable used for restraining the buoyant instrument package includes a sensing element to prevent excessive retraction of the instrument package by interrupting power supplied to the power drive assembly. The system includes two electrical cables; one supplies power and the other transmits signals between the shore station and the bottom-mounted winch and instrument package.

3 Claims, 7 Drawing Figures

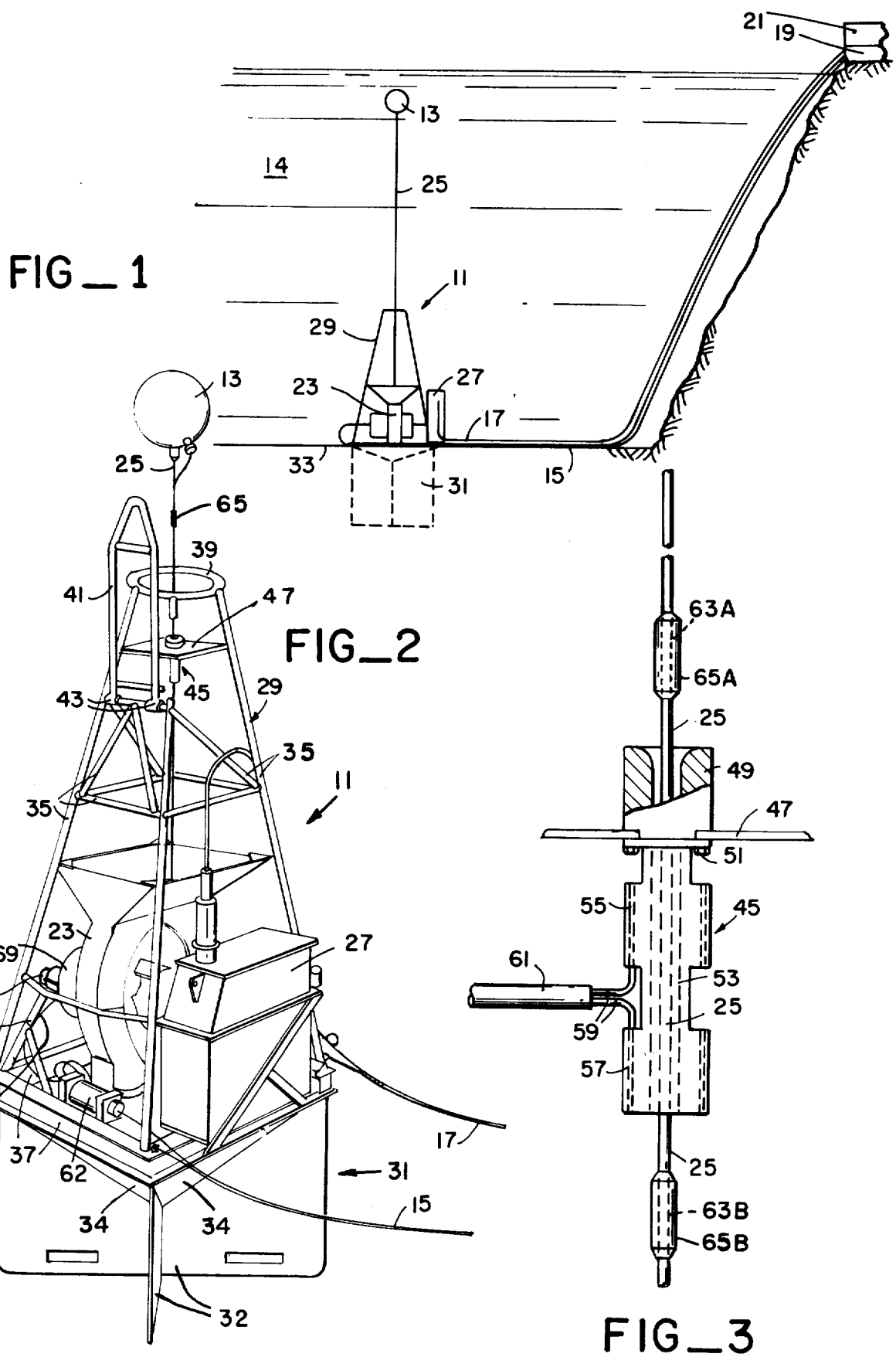

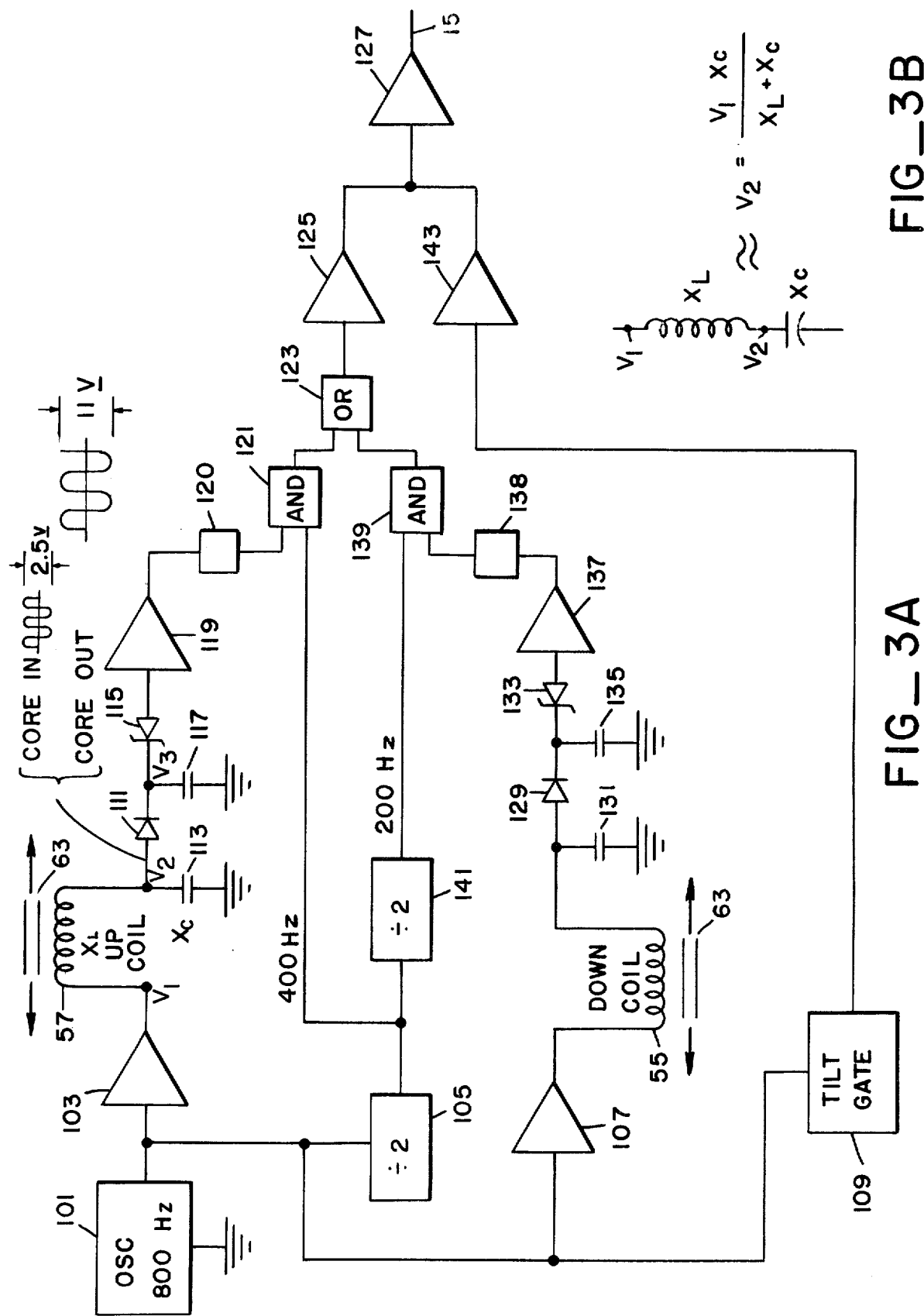

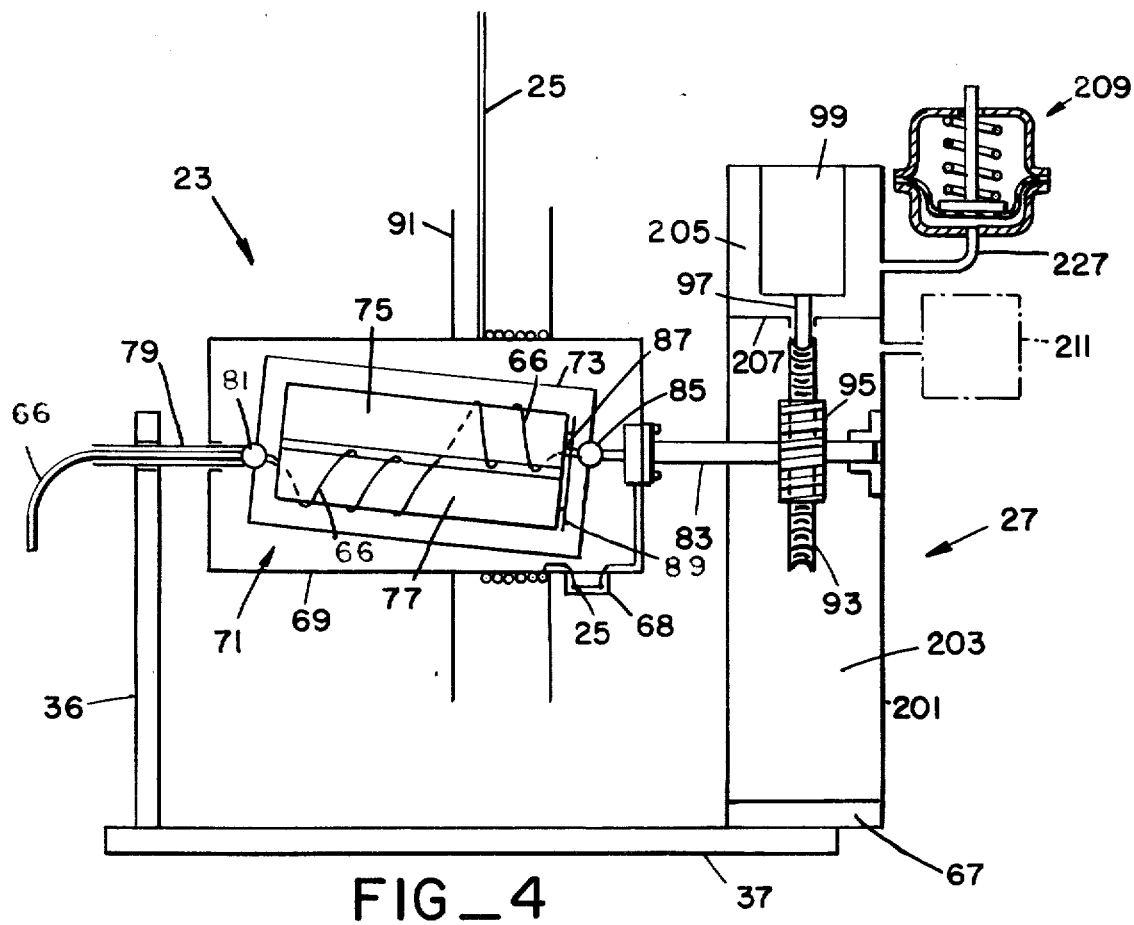
FIG_4
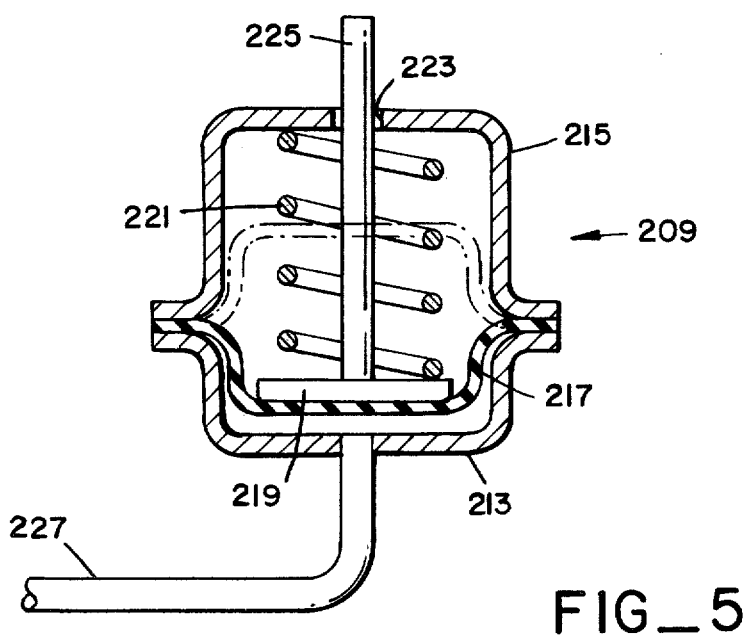
FIG_5

REMOTELY CONTROLLED UNDERWATER INSTRUMENT SYSTEM

BACKGROUND OF THE INVENTION

1. Field of the Invention

The present invention relates to an instrument system and more particularly to a remotely controlled instrument system that is mounted on the ocean floor and raises or lowers a buoyant instrument package to any predetermined ocean depth.

2. Description of the Prior Art

By current practice, instrumentation that is to be variably positioned between the ocean floor and the surface is suspended from surface craft. Such craft are often inoperable in rough water, are expensive to maintain and require a relatively large crew that is not directly involved in data gathering from the various instruments.

The present invention overcomes these disadvantages by employing an instrument system that is mounted on the ocean floor wherein a buoyant instrument package is variably positioned from the ocean floor by remote control from a shore station. Also, the instrument package is controlled and monitored from shore.

SUMMARY OF THE INVENTION

An instrument system that is mounted on the ocean floor that may be used for generating and receiving sound signals. The system includes a buoyant instrument package that is raised and lowered by a support cable driven by winch and power drive assemblies that are controlled and powered from a remote shore station. The system includes a tower that is attached to a base member upon which the winch and power drive assemblies are mounted. The base member includes a plurality of downwardly extending blades and angularly positioned plates that securely support the system when resting on the ocean floor. When retracted, the buoyant instrument package floats a few feet above the tower. The cable used for restraining the buoyant instrument package includes a sensing element to prevent excessive retraction of the instrument package by interrupting power supplied to the power drive assembly. The system includes two electrical cables; one supplies power and the other transmits signals between the shore station and the bottom-mounted winch and instrument package.

STATEMENTS OF THE OBJECTS OF THE INVENTION

An object of the present invention is to provide a remotely controlled winch system;

Another object of the present invention is to provide a remotely controlled instrument system; and Still another object of the present invention is to provide a remotely controlled winch and/or instrument system that may be mounted on the ocean floor.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a schematic drawing of the ocean bottom mounted instrument system of the present invention;

FIG. 2 is an enlarged and detailed pictorial view of the instrument system shown in FIG. 1;

FIG. 3 is an enlarged view of the limit sensor assembly of FIG. 2;

FIG. 3A is a schematic diagram of the control circuit used in cooperation with the limit sensor assembly of FIGS. 2 and 3;

FIG. 3B shows an equivalent circuit of the control aspect of the circuit of FIG. 3A;

FIG. 4 is a schematic diagram of the winch and power drive assemblies of FIGS. 1 and 2; and FIG. 5 is a schematic diagram of the pressure compensator of FIG. 4.

DESCRIPTION OF THE PREFERRED EMBODIMENTS

In FIG. 1 is illustrated a bottom mounted winch system 11 that raises and lowers a buoyant instrument package 13 in a body of water 14. Instrument package 13 contains various instruments for receiving and/or transmitting signals, such as acoustic signals, in the water. Control and power for the instrument package and the winch system are respectively provided through electrical cables 15 and 17 that are respectively connected to sources 19 and 21 which are located on shore. Source 19 is the power, control and monitor source for the instruments in instrument package 13. Source 21 is the power and control source for driving the motor that raises and lowers the buoyant instrument package.

As illustrated in FIG. 1, the instrument package 13 is allowed to rise, by buoyant forces of water, by winding the restraining cable from winch assembly 23. The instrument package is lowered by winding the cable onto the winch assembly. As illustrated in FIG. 2, restraining cable 25 is electrically connected to cable 15 by means of junction box 62 and cable 66. The winch assembly 23 is driven by power drive assembly 27, which are both mounted on frame 29. Connected to and extended downwardly from frame 29 is base member 31 which extends into the mud of ocean floor 33.

As best depicted in FIG. 2, a tower or frame 29 consists of a plurality of support members 35 including four vertically extending members which are respectively attached to the four corners of base 37 of frame 29. These four members are also connected to ring 39 which supports instrument package 13 in the initial retracted position prior to actual implanting in the ocean. Mounted on the upper part of frame 29 is lifting and lowering support member 41 which is mounted on hinges 43. Also mounted in the upper region of frame 29 is limit sensor assembly 45, the details of which are illustrated in FIG. 3.

The base member 31 includes a plurality of downwardly extending blades 32 and angularly positioned plates 34 positioned therebetween. It is to be understood that different numbers of blades and plates may be employed. It has been found that four blades and four plates are satisfactory for mud floor conditions. However, when the ocean floor is firm, a base of three or more legs with support pads are preferred. When the ocean floor consists of mud or the like, then the blades will cut downward through the mud until the force of the mud against plates 34 equals the net weight of the assembly. Blades 32 provide a large surface area in contact with the mud thereby providing firm lateral support which prevents tipping of the tower. The tower is also self-straightening while being lowered into the mud because of the angulation of plates 34. An automatic winch braking system is provided to prevent over-retraction and over-extension of the instrument package. This is achieved by use of a limit sensor assembly 45 and a cable position indicator 65.

Referring to FIGS. 2 and 3, limit sensor assembly 45 is mounted on plate 47 and upper guide 49 by means of bolts 51. Upper guide 49 is preferably made of plastic material, is tapered at the top and includes an opening through which cable 25 passes. The limit sensor assembly 45 is preferably made of plastic encapsulating material and includes an opening 53 through which cable 25 passes. Down coil 55 and up coil 57 are respectively embedded in the upper and lower regions of the sensor and have a separation formed therebetween. The lead wires 59 of these coils pass through cable 61 to junction box 62 mounted on base 37 of frame 29. Cable 25 includes a portion indicator 65A and 65B comprising a flat foil 63A and 63B of magnetic conducting material, such as high permability steel foil, that is wound on the outer surface of cable 25 and is covered by plastic material. As the foil passes through either down coil 55 or up coil 57, it will change the inductance of the coil. This change of inductance is sensed by the circuitry in junction box 62, the details of which are shown in FIG. 3A.

In FIG. 3A is illustrated the control circuit employed in junction box 62 of FIG. 2. This circuit includes down coil 55 and up coil 57. As illustrated, the output of 800 Hz oscillator 101, for example, is applied in parallel to the inputs of AC amplifier 103, divide-by-two circuit 105, AC amplifier 107, and tilt gate 109. The output of AC amplifier 103 is applied to one side of up coil 57 and the other side of up coil 57 is applied to the anode of diode 111 and to one side of capacitor 113. The other side of capacitor 113 is connected to ground. The cathode of diode 111 is connected to zener diode 115 and through capacitor 117 to ground. Zener diode 115 is preferably selected to have a threshold of about 5.5 volts and is connected through DC amplifier 119 to the input of inverter 120, the output of which is connected to one input of AND gate 121. The output of AND gate 121 is connected to one input of OR gate 123, the output of which is connected to the input of AC amplifier 125, the output of which is connected to the input of driver amplifier 127. The output of driver amplifier 127 is connected to electrical cable 15 which transmits the signal to power and control source 19 which is electrically coupled to power source 21 of FIG. 1.

The output of AC amplifier 107 is applied to one side of down coil 55 and the other side of down coil 55 is applied to the anode of diode 129 and through capacitor 131 to ground. The cathode of diode 129 is connected to zener diode 133 and through capacitor 135 to ground. The output of zener diode 133 is applied to the input of DC amplifier 137, the output of which passes through inverter 138 and is applied to one input of AND gate 139. The output of AND gate 139 is connected to one input of OR gate 123.

The output of divide-by-two circuit 105 is applied in parallel to the input of divide-by-two circuit 141 and to one input of AND gate 121. The output of divide-by-two circuit 141 is applied to one input of AND gate 139. The output of tilt gate 109 is connected through AC amplifier 143 to the input of driver amplifier 127.

The various frequencies of operation are illustrated in FIGS. 3A wherein the output of oscillator 101 is 800 HZ; the output of divide-by-two circuit 105 is 400 Hz; and the output of divide-by-two circuit 141 is 200 Hz.

The principle of operation of the up and down coil circuitry is the same and therefore the following description will be made only with respect to the up coil circuitry. The inductive reactance ($X_L$) of coil 57 and the capacitive reactance ($X_C$) of capacitor 113 together function in accordance with the equivalent circuit shown in FIG. 3B. From this circuit and the associated symbols it can be seen that voltage $V_2$ will decrease when $X_L$ increases. As a result, the voltage $V_2$ will be about 11 volts when the core (position indicator 65B) of coil 57 is out and about 2.5 volts when the core is inserted, as illustrated in FIG. 3A. Capacitor 117 functions to average the pulsed DC output from diode 111 so that it has a constant DC level. Therefore, the voltage $V_3$ will be about 2 volts (core inserted) and about 7 volts (core removed) during operation. Zener diode 115 has a threshold of about 5.5 volts and therefore conducts only when the 7 volts signal is applied thereto. Therefore, no DC signal is applied to the input DC amplifier 119 when the core is inserted in coil 57 and therefore inverter 120 applies an output signal to AND gate 121 only when the core is inserted into the coil. The same is true of the down coil circuit. That is, an output signal is provided from inverter 138 only when the core is inserted into coil 55. Continuously applied to one input of AND gate 139 is the 200 Hz signal from divide-by-two circuit 141. Therefore, when a DC signal is applied from inverter 138, the system will transmit this 200 Hz signal to shore. Continuously applied to one input of AND gate 121 is the 400 Hz signal from divide-by-two circuit 105. Therefore, when a DC signal is applied from inverter 120 to AND gate 121, the system will transmit this 400 Hz signal to shore. Receipt at shore of either the 200 Hz or 400 Hz signals will result in interruption of the power from shore, through electrical cable 17, from being applied to motor 99 of FIG. 4, and thereby causes the movement of cable 25 to stop at the proper up or down positions. The two different frequencies are used to distinguish the up and down movements of the cable and to prevent further downward movement of the cable after the 200 Hz signal has shut off the power to the motor. The same is equally true of the up stop of the cable.

The tilt gate may be any type of instrument or sensor that senses tilting of the bottom mounted winch system. For example, it may be a spherical mercury switch which senses tilting of 30° in any direction. When this tilting occurs, then tilt gate 109 turns on and transmits the 800 Hz signal through amplifiers 143 and 127 to shore. This alerts the shore station to the fact that such tilting has occurred which will then require the necessary corrective action.

In FIG. 4 are illustrated the details of the winch assembly 23 and the power drive assembly 27. The winch assembly is supported by support members 36 and the power drive assembly 27 is supported by base plate 67, both of which are connected to base 37 of frame 29. The winch assembly 23 includes drum 69 in which is positioned transfer cable assembly 71. The transfer assembly includes a drum 73 and cable spools 75 and 77, which are wound with electrical cable 66 in opposite directions. Support shaft 79 is connected through universal joint 81 to spool 77. Drive shaft 83 is connected to drum 69 and to universal joint 85 to spool 75. Spool 75 drives spool 77 in the opposite direction of rotation through gears 87 and 89. Therefore, as shaft 83 rotates drum 69 in one direction, electrical cable 66 is wound from spool 75 to spool 77 and when driven in the opposite direction it is wound from spool 77 to spool 75. The electrical cable 66 passes from spool 77 through universal joint 85 directly to the end of and into cable 25 through junction box 68. This makes it possible to use continuous electrical cable 66 and eliminates the need for electrical slip couplings which would be otherwise required. However, it is to be understood that electrical slip couplings could be used in place of the above described spool transfer system. The power drive assembly 27 includes a gear 93 to which is connected shaft 83. Worm gear 95 is coupled to gear 93 and is driven by shaft 97 of motor 99. The power drive assembly includes housing 201 which is formed into compartments 203 and 205 by partition 207. Compartment 203 is filled with lubricating oil and compartment 205 is filled with an oil having dielectric characteristics that are suitable for having an electric motor emersed therein. Pressure compensator devices 209 and 211, the details of which are shown in FIG. 5, are identical and are respectively connected to compartments 205 and 203. These compensators maintain the pressure of the oil in these compartments at a pressure of about 2 psi above the pressure of the ambient seawater.

In FIG. 5 is illustrated pressure compensator 209 which includes lower housing 213 and upper housing 215. A rubber impregnated cloth 217 is positioned between these housings. A piston 219 is in contact with cloth 217 and is loaded by spring 221 to provide 2 psi differential pressure. Seawater is allowed to pass through the opening 223 that is formed between the shaft 225 and upper casing 215. Oil from chamber 205 passes through conduit 227 to the lower region of the pressure compensator and is maintained at a pressure about 2 psi above ambient seawater by means of combining the pressure of the seawater and the bias of spring 221. This minimizes the strain on housing 201, and if a leak does occur, the oil will flow out of the compartment and into the sea rather than having the seawater flow into the compartment. The oil will flow in this direction because at ambient pressure the oil will occupy the volume indicated by the dotted lines whereas when under normal elevated seawater pressures it will occupy the volume, as illustrated by solid lines. It is to be understood that a single compartment and a single pressure compensator could be used in place of the two compartments and compensators described above. This is possible with an oil having both gear lubricating characteristics and electrical dielectric characteristics.

It is to be understood that the above described system may be used for remotely controlling any type of buoyant object which may contain any type of instrument system or other objects. Moreover, the instruments in the buoyant object may be active or passive and may be powered by a self contained power source or from shore.

What is claimed is:

1. A winch system comprising:
 a. an elongated upwardly extending rigid structure having one end mounted on a base member and the other end for supporting a buoyant object;
 b. drive means for withdrawing or releasing said buoyant object;
 c. said drive means being mounted on said one end of said elongated rigid structure;
 d. said base member includes a plurality of downwardly extending blades;
 e. adjacent blades of said plurality of downwardly extending blades being positioned at about right angles with respect to each other;
 f. a plurality of angularly positioned plates are each positioned between adjacent downwardly extending blades; whereby
 g. lowering said winch system onto a soft surface results in said plurality of downwardly extending blades cutting downward through said soft surface and said angularly positioned plates being forced against said soft surface.

2. The device of claim 1 wherein:
 a. said drive means including a winch assembly, a power drive assembly, and a support cable;
 b. said cable being wound on said winch assembly wherein one end of said support cable is operatively connected to said buoyant object; and
 c. said power drive assembly being operatively connected to said winch assembly for selectively driving said winch in either the clockwise or counterclockwise direction.

3. A winch system comprising:
 a. an elongated rigid structure having one end mounted on a base member and the other end for supporting a buoyant object;
 b. drive means including a support cable for withdrawing or releasing said buoyant object;
 c. said drive means being mounted on said elongated structure;
 d. said base member includes a plurality of downwardly extending blades;
 e. a plurality of angularly positioned plates are each positioned between adjacent downwardly extending blades;
 f. a limit sensor assembly is mounted on said elongated structure;
 g. a position indicator comprising magnetic conducting material operatively connected to said support cable;
 h. control means responsive to the interaction of said limit sensor assembly and said position indicator for stopping said drive means;
 i. said limit sensor assembly includes first and second spaced apart coils surrounding said support cable;
 j. said control means including inductance responsive means; and
 k. said inductance responsive means generating a signal of a first frequency when said position indicator is not interacting with said limit sensor assembly and generating a signal of a second frequency when said position indicator is interacting with said first coil and generating a signal of a third frequency when said position indicator is interacting with said second coil.

* * * * *